No. 671,179. Patented Apr. 2, 1901.
L. A. BROD.
TROLLEY CAR.
(Application filed Aug. 15, 1900.)
(No Model.)
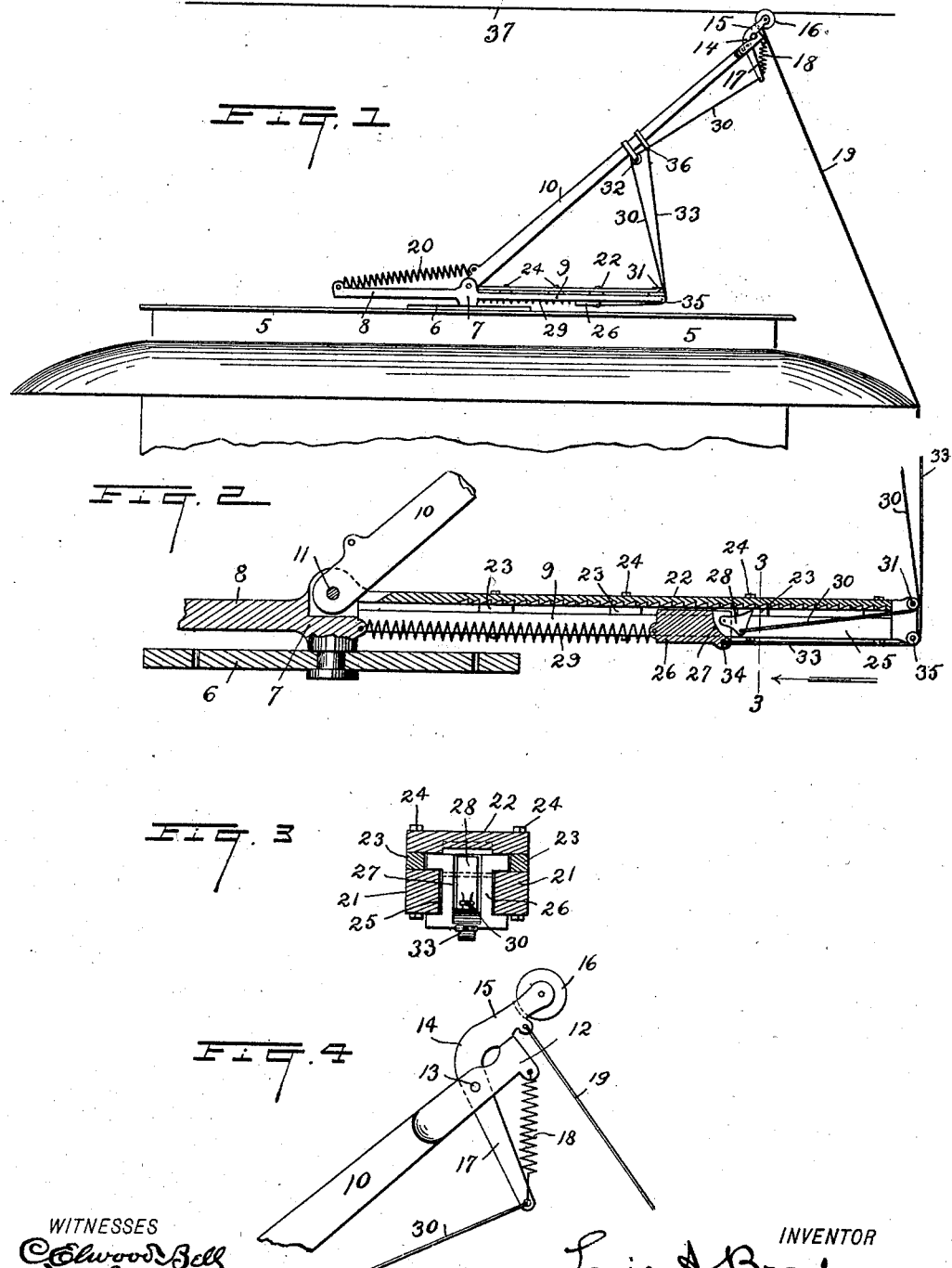
WITNESSES
INVENTOR
Louis A. Brod
BY
ATTORNEYS

UNITED STATES PATENT OFFICE.

LOUIS A. BROD, OF BROOKLYN, NEW YORK.

TROLLEY-CAR.

SPECIFICATION forming part of Letters Patent No. 671,179, dated April 2, 1901.

Application filed August 15, 1900. Serial No. 26,941. (No model.)

*To all whom it may concern:*

Be it known that I, LOUIS A. BROD, a citizen of the United States, residing at Brooklyn, in the county of Kings and State of New York, have invented certain new and useful Improvements in Trolley-Cars, of which the following is a full and complete specification, such as will enable those skilled in the art to which it appertains to make and use the same.

This invention relates to trolley-cars, and particularly to the arm or pole thereof which carries the trolley-wheel; and one object of the invention is to provide improved devices to permit the trolley arm or pole to rise and fall synchronously with the rise and fall of the trolley wire or conductor, or with the undulations thereof, a further object being to provide devices operating in connection with the first-named devices to prevent the trolley arm or pole from flying up when the trolley-wheel "jumps" the wire or conductor.

The invention is fully disclosed in the following specification, of which the accompanying drawings form a part, in which the separate parts of my improvement are designated by the same reference characters in each of the views, and in which—

Figure 1 is a side view of the top of a car provided with my improvement; Fig. 2, a sectional side elevation of a part of the improvement detached; Fig. 3, a cross-section on the line 3 3 of Fig. 2, and Fig. 4, a side view of the trolley-wheel attachment on an enlarged scale.

In the drawings forming part of this specification I have shown at 5 in Fig. 1 a part of the top of a car, and in the practice of my invention I secure thereto a plate 6, to which is pivoted a support 7, which is adapted to turn in a horizontal plane, and said support is provided with two arms or extensions 8 and 9, which project in opposite directions.

The trolley-arm 10 is pivoted to the support 7 at 11 and is provided at its free end with a head 12, rearwardly of which is pivoted, as shown at 13, a crank-lever 14, one arm of which projects upwardly and forwardly, as shown at 15, and carries the trolley-wheel 16, and the other arm of which projects downwardly and backwardly, as shown at 17, and is connected with the head 12 by a contractile spring 18, and the cord 19, by means of which the trolley-arm is manipulated from the platform of the car, is connected with the arm 15 of the crank-lever 14 just rearwardly of the support of the trolley-wheel 16, as clearly shown in the drawings, and the arm 15 of the said crank-lever when in its normal position rests on the head 12 of the trolley-arm 10, as shown in Figs. 1 and 4.

The trolley-arm 10 is connected with the end of the extension 8 of the support 7 by a strong contractile spring 20, and the other extension 9 of the support 7 is much longer than the extension 8 and consists of two parallel side bars 21, over which is placed a ratchet-plate 22, having ratchet-teeth in its under side, and between the side bars 21 and the ratchet-plate 22 are preferably placed blocks 23, and said ratchet-plate, blocks, and side bars are connected by bolts 24.

Mounted in the longitudinal space 25 between the side bars 21 is a longitudinal movable block 26, the end of which in the direction of the end of the extension 9 of the support 7 is cut out, as shown at 27, to form a chamber in which is pivoted a dog 28, and the block 26 is connected with the support 7 by a contractile spring 29. The dog 28 is adapted to operate in connection with the ratchet-teeth on the under side of the plate 22, and connected with the lower side of said dog is a cord 30, which passes outwardly over a pulley 31 in the end of the extension 9 and upwardly over a pulley 32, secured to the trolley arm or pole 10, from which point it passes to and is connected with the arm 17 of the crank-lever 14. Another cord 33 is connected with the block 26 at 34 and is passed beneath and around a pulley 35 in the end of the extension 9 of the support 7, from which point it is passed upwardly and connected with the trolley-arm 10 at 36.

The object of the cord 30 and the dog 28 is to prevent the trolley-arm from flying up above the trolley wire or conductor 37 when the trolley-wheel jumps said trolley wire or conductor or is disconnected therewith, and said dog 28 is never in operation except when the trolley-wheel is disconnected from the trolley wire or conductor, at which time the spring 18 operates to produce, in connection with the cord 30 and the said dog 28, the result above specified.

In the normal position of the parts when the trolley-wheel is in connection with the trolley wire or conductor, the block 26 is free to slide in the extension 9 of the support 7 and the trolley-arm 10 will rise and fall to correspond with the rise and fall of the trolley wire or conductor 37; but if at any time the trolley-wheel should be disconnected from the trolley-wire, either accidentally or otherwise, the cord 30 and the parts with which it is connected will at once operate to prevent said arm from rising to any considerable extent above the trolley wire or conductor.

It will be understood that the support 7 and all the parts connected therewith may be turned entirely around whenever desired by means of the cord 19 in the usual manner, and the trolley-arm 10 may also be operated in the usual manner by the said cord 19 from either end of the car.

Having fully described my invention, I claim as new and desire to secure by Letters Patent—

1. A support for the trolley-arm of a vehicle, a spring-operated trolley-arm pivotally connected therewith and provided at its free end with a spring-operated crank-lever, one end of which carries the trolley-wheel and the other of which projects below the trolley-arm, said support being also provided with an extension which projects in the same direction as the trolley-arm and is provided with a longitudinal chamber the top of which serves as a rack-bar, a slidable spring-operated block mounted in said extension, a dog pivotally connected with said block and operating in connection with said rack-bar, and also in operative connection with said crank-lever, said block being also connected with the trolley-arm, substantially as shown and described.

2. A support for the trolley-arm of a vehicle, a trolley-arm pivoted to said support, and provided at its free end with a pivoted crank-lever one end of which projects upwardly and forwardly and carries the trolley-wheel, and the other end of which projects downwardly and backwardly and is connected with the trolley-arm in front thereof by a contractile spring, said support being provided with oppositely-directed extensions, one of which is connected with the trolley-arm by a contractile spring, and the other of which is provided with a longitudinal chamber or space, the top of which is provided with ratchet-teeth in its under side, a slidable block mounted in said chamber or space and connected with the support by a contractile spring, a dog mounted in the outer end of said block and operating in connection with the said ratchet-teeth, and a cord connected with said dog and in operative connection with the downwardly and backwardly directed end of said crank-lever, and another cord connected with said block and said trolley-arm, substantially as shown and described.

3. A support for the trolley-arm of a vehicle, a trolley-arm pivoted to said support, and provided at its free end with a pivoted crank-lever one end of which projects upwardly and forwardly and carries the trolley-wheel, and the other end of which projects downwardly and backwardly and is connected with the trolley-arm forwardly thereof by a contractile spring, said support being provided with oppositely-directed extensions, one of which is connected with the trolley-arm by a contractile spring, and the other of which is provided with a longitudinal chamber or space, the top of which is provided with ratchet-teeth in its under side, a slidable block mounted in said chamber or space and connected with the support by a contractile spring, a dog mounted in the outer end of said block and operating in connection with the said ratchet-teeth, and a cord connected with said dog and in operative connection with the downwardly and backwardly directed end of said crank-lever, substantially as shown and described.

4. A support for the trolley-arm of a vehicle, said support being adapted to be pivoted to the top of the car, and to turn in a horizontal plane, said support being also provided with a pivoted trolley-arm, and with oppositely-directed extensions, one of said extensions being connected with the trolley-arm by a contractile spring, and the other being provided with a longitudinal space the cover of which is provided on its under side with ratchet-teeth, and a slidable block mounted in said space and connected with said support by a contractile spring, said block being provided at its outer end with a pivoted dog which operates in connection with said ratchet-teeth, a crank-lever mounted in the end of the trolley-arm and provided with an upwardly and forwardly directed arm in which the trolley-wheel is mounted, and a downwardly and backwardly directed arm, said last-named arm being connected with the end of the trolley-arm by a contractile spring, a cord connected with the last-named arm of the crank-lever and passed around a pulley in the end of the extension of the support in which the slidable block is placed, said cord being connected with said dog, and another cord connected with said slidable block and passed around the end of the said extension of the support in which said block is placed and connected with the trolley-arm, substantially as shown and described.

5. A support for the trolley-arm of a vehicle, said support being adapted to be pivoted to the top of the car, and to turn in a horizontal plane, said support being also provided with a pivoted trolley-arm, and with oppositely-directed extensions, one of said extensions being connected with the trolley-arm by a contractile spring, and the other being provided with a longitudinal space the cover of which is provided on its under side with ratchet-teeth, and a slidable block mounted in said space and connected with said support by a contractile spring, said block being provided at its outer end with a pivoted dog which operates in connection with said ratchet-teeth, a crank-lever mounted in the end of the trolley-arm, and provided with an upwardly and forwardly directed arm in which the trolley-wheel is mounted, and a downwardly and backwardly directed arm, said last-named arm being connected with the end of the trolley-arm by a contractile spring, a cord connected with the last-named arm of the crank-lever and passed around a pulley connected with the trolley-arm and around another pulley in the end of the extension of the support in which the slidable block is placed, said cord being connected with said dog, substantially as shown and described.

6. A rotatable support for the trolley-arm of a trolley-car, a spring-operated trolley-arm pivotally connected therewith, and provided at its free end with a spring-operated trolley-wheel support, a portion of which projects below the trolley-arm, the support for the trolley-arm being also provided with an extension which projects in the same direction as the trolley-arm, and is provided with a longitudinally-movable block or member, means for drawing said block or member toward the support of the trolley-arm, a supplemental device pivoted thereto and adapted to limit the movement of said block or member in the opposite direction, said last-named device being also in operative connection with the support of the trolley-wheel, and said block or member being also connected with the trolley-arm, substantially as shown and described.

In testimony that I claim the foregoing as my invention I have signed my name, in presence of the subscribing witnesses, this 13th day of August, 1900.

LOUIS A. BROD.

Witnesses:
F. A. STEWART,
C. C. OLSEN.